United States Patent [19]

Tada et al.

[11] Patent Number: 4,893,195
[45] Date of Patent: Jan. 9, 1990

[54] IMAGE PROCESSING APPARATUS CAPABLE OF ELIMINATING MOIRE PATTERN

[75] Inventors: Kaoru Tada; Masamichi Kishi, both of Azuchi, Japan

[73] Assignee: Minolta Camera Kabushiki Kaisha, Osaka, Japan

[21] Appl. No.: 236,554

[22] Filed: Aug. 25, 1988

[30] Foreign Application Priority Data

Aug. 27, 1987 [JP] Japan .................. 62-213694
Sep. 26, 1987 [JP] Japan .................. 62-241697

[51] Int. Cl.$^4$ .................. H04N 1/40; H04N 1/46
[52] U.S. Cl. .................. 358/454; 358/451; 358/453
[58] Field of Search .............. 358/280, 287, 454, 451, 358/453

[56] References Cited

U.S. PATENT DOCUMENTS

| | | | |
|---|---|---|---|
| 4,101,929 | 7/1978 | Ohneda | 358/44 |
| 4,318,123 | 3/1982 | Knop | 358/43 |
| 4,386,849 | 6/1983 | Häeusler | 356/124 |
| 4,390,235 | 6/1983 | Minoura . | |
| 4,403,258 | 9/1983 | Balzan | 358/284 |
| 4,577,235 | 3/1986 | Kannapell | 358/280 |
| 4,613,896 | 9/1986 | Takita | 358/76 |
| 4,673,972 | 6/1987 | Yokomizo . | |
| 4,675,727 | 6/1987 | Sekizawa et al. . | |
| 4,682,243 | 7/1987 | Hatayama | 358/451 |
| 4,760,608 | 7/1988 | Suzuki | 382/61 |
| 4,772,119 | 9/1988 | Bouwhuis | 356/124 |
| 4,812,915 | 3/1989 | Tada | 358/454 |

FOREIGN PATENT DOCUMENTS

| | | |
|---|---|---|
| 61-6978 | of 0000 | Japan . |
| 57-11570 | of 0000 | Japan . |
| 57-65959 | of 0000 | Japan . |
| 57-91071 | of 0000 | Japan . |
| 59-101959 | of 0000 | Japan . |
| 59-123367 | of 0000 | Japan . |
| 59-176978 | of 0000 | Japan . |

Primary Examiner—Edward L. Coles, Sr.
Assistant Examiner—Jerome Grant
Attorney, Agent, or Firm—Price, Gess & Ubell

[57] ABSTRACT

When an original comprised of a plurality of areas different half tone images is read, any one of the areas is designated at first. A magnification rate of projection for eliminating moire pattern is set and the image of the original is projected on the image sensor at this magnification rate to be converted into electrical data. The electrical data is electrically reduced at a reducing magnification rate which is in correspondence with the magnification rate of projection. Among the reduced electrical data, only those for the designated area are half tone processed and outputted, and the image of that area is printed on a paper. Thereafter, designation of other areas is carried out and the electrical data is outputted by similar processing. The images of these areas are printed on the same paper, whereby all images of the original are formed on the paper without moire pattern.

24 Claims, 8 Drawing Sheets

IMAGE PROCESSING APPARATUS CAPABLE OF ELIMINATING MOIRE PATTERN

CROSS REFERENCE TO RELATED COPENDING APPLICATION

A related copending application of particular interest to the present application is U.S. Ser. No. 31430 entitled "Image Reading Apparatus Capable of Eliminating Moire Pattern" filed on Mar. 27, 1987 and assigned to the same applicant of the present application.

BACKGROUND OF THE INVENTION

1. Field of the Invention

The present invention relates to an image processing apparatus and, more specifically, to an image processing apparatus capable of eliminating moire patterns generated in reading dot images.

2. Description of the Prior Art

A digital copying machine has been known in which an original image is read by an image pickup device where the image is printed a paper by laser printer, and the like, based on the image data obtained therefrom.

However, there arises a problem in reading an original image such as a photograph or a painting having thick portions and thin portions provided as a dot image by a half tone etching method. More specifically, because of the relation between the pitch between each of the dots and the reading pitch by the image pickup device, or because of a subtle deviation of phase based on the periodicity in half tone processing, a periodical pattern of thick and thin portions called a moire pattern is generated, providing a causing trouble in viewing.

A method has been proposed to prevent the generation of the moire pattern, in which the dimensions or pattern of a Dither matrix is changed in half tone processing. However, the moire pattern can not be eliminated by this conventional method when the reading pitch (the pitch between pixels in the image pickup device) itself is the cause of the moire pattern. In view of the foregoing, the applicant of the present invention proposed, in the above mentioned related application, an image processing apparatus capable of eliminating moire pattern employing optical enlarging means for enlarging an original image to be read by an image pickup device and electrical reducing means for reducing the image by thinning out image data read by the image pickup device. Accordingly, by adjusting the rates of magnification of the optical enlarging means and the electrical reducing means in association with the dot pitch of the original, the moire pattern can be effectively eliminated. However, when a plurality of images having thick portions and thin portions (half tone images) having different pitches of dots are included in the original image, the moire pattern cannot be eliminated in all of the images.

In another method, the moire pattern is eliminated by arranging a filter for eliminating the moire pattern in a light path in reading the original image and by gradating the image by normally focused on one pixel of the image pickup device into adjacent pixels. However, the moire pattern cannot be eliminated in all of the images having thick portions and thin portions even by this method when a plurality of images with thick portions and thin portions having different dot pitches are included in the original image.

SUMMARY OF THE INVENTION

An object of the present invention is to provide an image processing apparatus capable of providing images with no moire pattern.

Another object of the present invention is to provide an image processing apparatus capable of providing an image with no moire pattern from an original that includes a plurality of images each having portions of different densities.

A further object of the present invention is to provide an image processing apparatus capable of eliminating moire patterns in each of the image areas of a plurality of images each having portions of different densities included in an original.

A still further object of the present invention is to provide an image processing apparatus capable of effectively eliminating moire pattern.

A still further object of the present invention is to provide an image processing apparatus capable of effectively eliminating moire pattern without requiring a trial and error process.

A still further object of the present invention is to provide an image processing apparatus capable of effectively eliminating moire pattern without requiring a trial and error process in each of the image areas of a plurality of images each having portions of different densities included in an original.

In order to attain the above described objects, the image processing apparatus of the present invention comprises an image sensor, optical projecting means, data reducing means, area designating means, magnification rate data setting means and control means. The image sensor converts images of the original into electrical data. The optical projecting means projects the images of the original onto the image sensor and can change the rate of magnification of the projection. The data reducing means electrically reduces the electrical data converted by the image sensor. The area designating means designates areas of the half tone images on the original. The magnification rate data setting means sets magnification rate data for eliminating moire patterns generated when the images in that area designated by the area designating means are converted by the image sensor. The control means controls the optical projecting means such that the optical projecting means projects images of the original with the projection magnification rate based on the magnification data set by the magnification rate data setting means, and controls the data reducing means such that the data reducing means reduces the electrical data with the reducing magnification rate corresponding to the projection magnification rate of the optical projecting means.

In an aspect, the image processing apparatus of the present invention comprises an image sensor, optical projecting means, data reducing means, moire pattern eliminating means, magnification rate determining means and control means. The image sensor converts images of an original into electrical data. The optical projecting means projects images of the original onto the image sensor and can change the projection magnification rate thereof. The data reducing means electrically reduces the electrical data converted by the image sensor with a reducing magnification rate corresponding to the projection magnification rate of the optical projecting means. The moire pattern eliminating means eliminates moire patterns generated when the images of the original are converted into the electrical data by the image sensor by controlling the optical projecting means such that it is activated at a prescribed projection magnification rate. The magnification rate determining means detects period of the generated moire pattern based on the electrical data converted by the image sensor and determines the magnification rate based on the period of the moire pattern. The control means controls the moire pattern eliminating means such that the moire pattern eliminating means is activated using the projection magnification rate determined by the magnification determining means.

In another aspect, the image processing apparatus of the present invention comprises an image sensor, optical projecting means, data reducing means, area designating means, moire pattern eliminating means, data control means, magnification determining means, and moire pattern controlling means. The image sensor converts images of an original into electrical data. The optical projecting means projects images of the original onto the image sensor and can change the projection magnification rate thereof. The data reducing means electrically reduces the electrical data converted by the image sensor with the reducing magnification rate corresponding to the projection magnification rate of the optical projecting means. The area designating means designates area of half tone images on the original. The moire pattern eliminating means eliminates moire patterns generated when the images of the original are converted into electrical data by the image sensor by controlling the optical projecting means to be activated at a prescribed projection magnification rate. The data controlling means operates to invalidate electrical data converted by the image sensor in areas other than those designated by the area designating means. The magnification rate determining means detects the period of the generated moire pattern based on the electrical data controlled by the data control means and determines the projection magnification rate based on the period of the moire pattern. The moire pattern controlling means operates to activate the moire pattern eliminating means using the projection magnification rate determined by the magnification determining means to eliminate the moire pattern in the designated areas.

Since the image processing apparatus structured as described above eliminates moire patterns in each of the different image areas each having portions of different densities, all of the moire patterns in the images can be eliminated.

In another aspect, the period of the moire pattern is detected based on the converted electrical data and the moire pattern is eliminated based on the period, whereby the moire patterns can be surely eliminated without requiring trial and error process.

In a further aspect, the period of the moire pattern in each of the image areas each having portions of different densities is detected and the moire patterns are eliminated in each of the areas based on the period, thereby enabling highly effective moire pattern elimination of the whole image.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
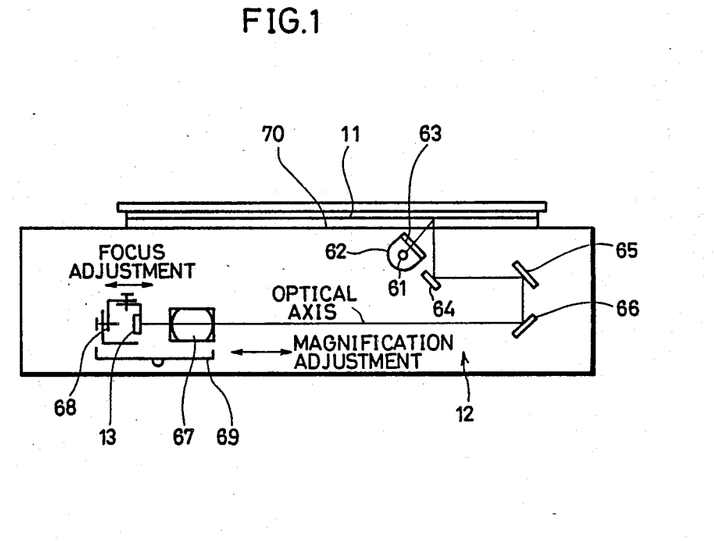
FIG. 1 is a cross sectional view showing a schematic structure of an image reader comprising an optical mechanism of an image processing apparatus in accordance with one embodiment of the present invention.

FIG. 1 is a cross sectional view showing a schematic structure of an image reader including the optical mechanism of an image processing apparatus in accordance with one embodiment of the present invention.

A halogen lamp 61 which is the source of exposure illuminates an original 11 placed on an original glass plate 70. The halogen lamp 61 is provided with a reflecting mirror 62 and an infrared filter 63. The operation thereof will be described in the following.

The light reflected from the original 11 is successively reflected by the mirrors 64, 65 and 66, and thereafter it enters an image pickup device (CCD) 13 through a lens 67.

The image pickup device 13 is held by a holder 68, and the position and angle thereof are adjusted. The holder portion 68 and the lens 67 are attached to a carriage 69. The magnification rate is adjusted by moving the carriage 69 in the direction of an optical axis by a moving mechanism, not shown, based on a lens magnification rate signal from a CPU included in the image processing apparatus. The focus adjustment is carried out by moving the holder portion 68 in the direction of the optical axis by a motor, not shown, provided on the carriage 69.

As is well known, the halogen lamp 61 and the mirrors 64, 65 and 66 are moved in the left and right directions for scanning in images of the original 11.

Figure 2:
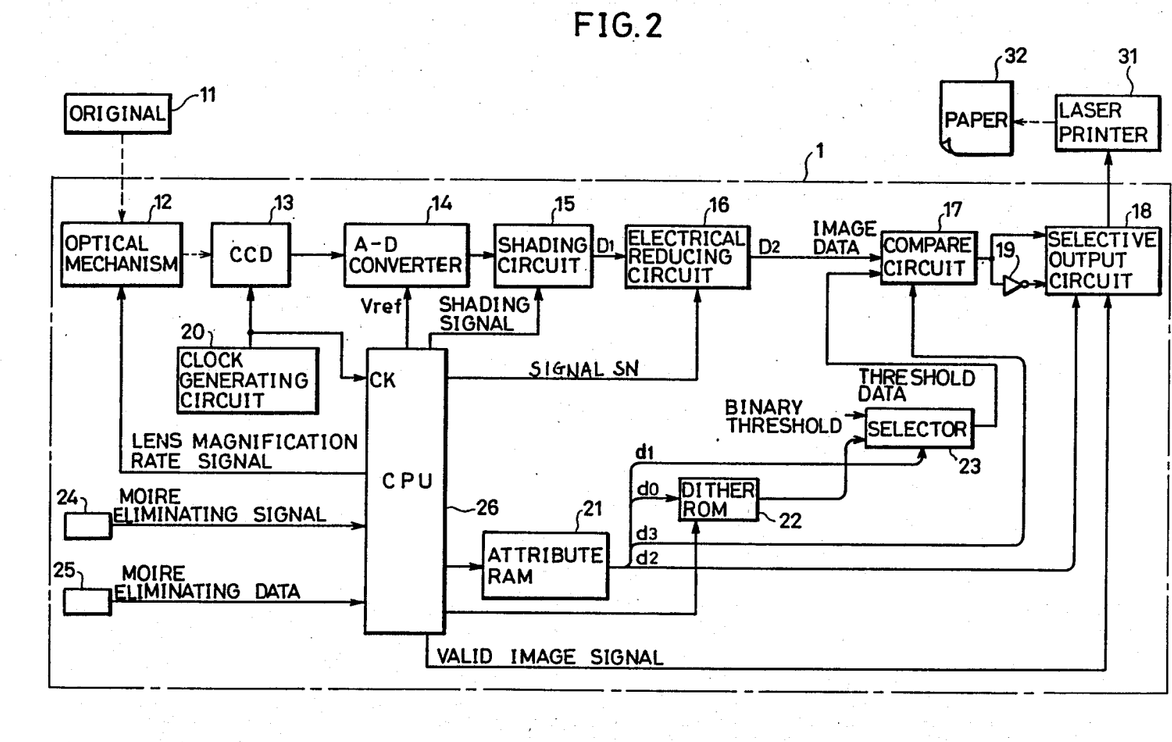
FIG. 2 is a block diagram showing an electrical circuit of the image processing apparatus in accordance with one embodiment of the present invention.

FIG. 2 is a block diagram showing an electric circuit of the image processing apparatus in accordance with one embodiment of the present invention.

The image processing apparatus 1 comprises an optical mechanism 12 capable of enlarging and reducing images of an original 11 by means of a zooming mechanism; an image pickup device 13 which reads images of the original 11 through the optical mechanism 12 and converts the same into electrical signals which correspond to the density of the indicia on the original; an A/D converter 14 which converts analog output signals from the image pickup device 13 into image data of digital signals; a shading circuit 15 which compensates for unevenness of light intensity of the image data in the main scanning direction and for diversification among characteristics of pixels of the image pickup device 13; an electrical reducing circuit 16 which reduces images by thinning the image data out; a compare circuit 17 for comparing the image data with threshold value data from a selector 23 to output binary signals; a selective output circuit 18 which outputs binary signals from the compare circuit 17 to a printer 31 in synchronization with valid image signals from a CPU; an inverter 19 which applies inverted signals of the binary signals to the selective output circuit 18; a clock generating circuit 20 which applies clock signals to the image pickup device 13 and to the CPU 26; an attribute RAM 21 which stores attribute data set from an operating panel, not shown; a Dither ROM 22 storing two types of threshold value patterns, that is, Dither pattern 1 and Dither pattern 2; a selector 23 which selects binary threshold value data and the threshold value data from the Dither ROM 22 in correspondence with attribute data and transfers the same to the compare circuit 17; a moire pattern eliminating signal generating portion 24 for sending a moire pattern eliminating signals to the CPU 26; a moire pattern eliminating data generating portion 25 for sending moire pattern eliminating data to the CPU 26; and the CPU 26 which controls all these components and other control devices, input devices, display devices and the like, not shown.

Figure 3:
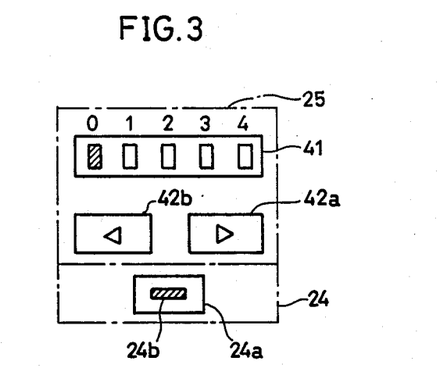
FIG. 3 shows an eliminating magnification setting portion of the moire pattern eliminating data generating portion of FIG. 2.

FIG. 3 shows an operation panel provided with a moire pattern eliminating signal generating portion 24 and a moire pattern eliminating data generating portion 25 in accordance with one embodiment of the present invention.

The moire pattern eliminating signal generating portion 24 comprises a moire pattern eliminating key 24a and the display thereof 24b. When an operator checks images printed on a paper 32 by the printer 31 and determines that the moire pattern is generated therein, the operator presses the moire pattern eliminating key 24a to send a moire pattern eliminating signal to the CPU 26. Accordingly, the display 24b is lit up to display the moire pattern eliminating mode. Meanwhile, in the moire pattern eliminating data generating portion 25, the display portion 41 is lit up and the display portion moves stepwise by operating an upkey 42a and a downkey 42b, whereby the eliminating magnification Nd can be set at one of four different steps.

The CPU 26 inputs the eliminating magnification rate Nd set by the above described eliminating magnification set portion 25 as the moire pattern eliminating data from the moire pattern eliminating data generating portion when a moire pattern eliminating signal is inputted.

The optical enlarging magnification rate and the electrical reducing magnification rate are determined in the following manner based on the inputted eliminating magnification rate Nd.

First, the optical enlarging magnification rate N is determined by multiplying the print magnification rate Na by the eliminating magnification rate Nd. If the result of operation exceeds the limit of the optical mechanism 12, the maximum possible magnification rate is selected as the optical enlarging magnification rate N. The electrical reducing magnification rate is calculated as 1/Nd. The electrical reducing magnification rate 1/Nd is further converted into reducing data SN which is outputted to the electrical reducing circuit 16 which will be described later, according to the following equation.

$$SN \text{ (integer)} = 1024 \times 1/Nd$$

Figure 4:
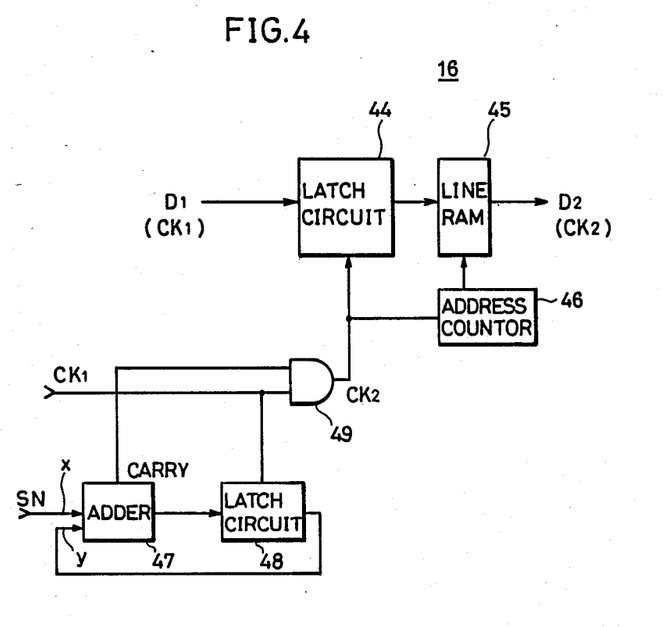
FIG. 4 is a block diagram showing the circuit structure of the electrical reducing circuit of FIG. 2.
Figure 5:
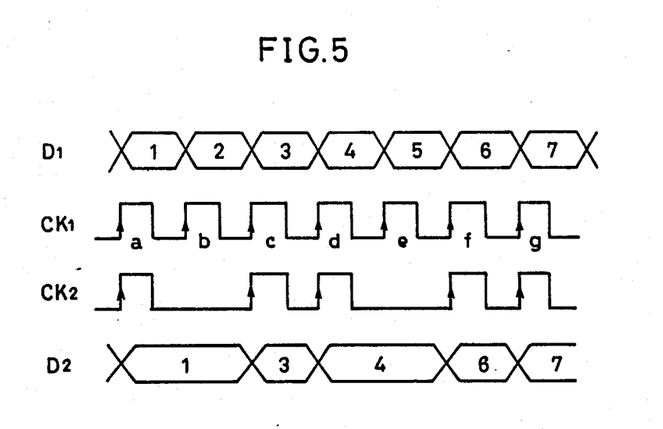
FIG. 5 is a time chart showing inputs and outputs of the main portion of the electrical reducing circuit of FIG. 4.

FIG. 4 is a block diagram of the electrical reducing circuit and FIG. 5 is a time chart showing inputs and outputs of a main portion of the electrical reducing circuit of FIG. 4.

The operation will be described in the following with reference to FIG. 4 and FIG. 5.

The image data D1 enters a latch circuit 44 at the timing of the clock CK1. The reducing data SN from the CPU 26 is inputted to a circuit for generating the clock CK2 comprising an adder 47, a latch circuit 48 and an AND gate 49. The adder 47 having a capacity of 1024 adds the reducing data SN to the output of the latch circuit 48 and outputs the same to the latch circuit 48. The timing of the output of the latch circuit 48 is supplied by the clock CK1.

When the result of addition by the adder 47 reaches 1024, a carry signal is sent to the AND gate 49. The AND output of the carry signal and the clock CK1 becomes the clock CK2. The latch circuit 44 latches the image data D1 by the clock CK2 and holds the data until the next clock CK2 is inputted. Therefore, the image data D1 entering the latch circuit 44 at the timing of the clock CK1 before the next clock CK2 is inputted will be discarded.

The image data outputted from the latch circuit 44 at the timing of the clock CK2 is written in a line RAM 45 having a storage capacity of 1 line. The clock CK2 is also inputted to the address counter 46 of the line RAM 45, whereby the data of reduced images which is thinned out in accordance with a prescribed manner (CK2 - CK1) is written in successive address locations in the line RAM 45. In this embodiment, the reducing magnification rate (1/N) is represented by 10 bits, and the magnification rate can be set as multiples of 1/1024.

FIG. 5 shows a timing chart of the electrical reducing circuit 16 with the moire pattern eliminating magnification rate Nd designated as 1.5. The reducing data signal SN is set to 683 and the output of the clock CK2 is obtained as follows. The reference characters x and y denote addition data shown in FIG. 4 and characters "a" to "g" correspond to output pulses of the clock CK1 shown in FIG. 5.

| x | y | | CK1 | CK2 pulse output |
|---|---|---|---|---|
| 0 + | 0 = 0 (corresponds to 1024 —>carry) | | a | present |
| 683 + | 0 = 683 | | b | — |
| 683 + | 683 = 342 + 1024 —>carry | | c | present |
| 683 + | 342 = 1 + 1024 —>carry | | d | present |
| 683 + | 1 = 684 | | e | — |
| 683 + | 684 = 343 + 1024 —>carry | | f | present |
| 683 + | 343 = 2 + 1024 —>carry | | g | present |

The operation of the moire pattern eliminating means comprised of the optical mechanism 12 and the electrical reducing circuit 16 will be described in the following.

The CPU 26 receives moire pattern eliminating data from the moire pattern eliminating data generating portion 25 in response to a moire pattern eliminating signal from the moire pattern eliminating signal generating portion 24, whereupon the CPU 26 calculates the optical enlarging magnification rate (lens magnification rate signal) and the electrical reducing magnification rate (reducing data signal SN) based on the eliminating magnification rate N and outputs the same to the optical mechanism 12 and the electrical reducing circuit 16, respectively.

Images of the original 11 is optically enlarged by a factor N by the optical mechanism 12 before being read by the image pickup device 13 and converted to electrical data. Thereafter, the electrical data is processed by the A/D converter 14 and the shading circuit 15. Finally, the electrical data is reduced to 1/Nd by the electrical reducing circuit 16.

Since the images of the original 11 are enlarged by the optical mechanism 12 and read by the image pickup device 13 with high resolution, the moire pattern caused by the deviation of phase between the dot pitch of the original 11 and the reading pitch can be eliminated. Since the enlarged images of the original 11 are subsequently reduced by the electrical reducing circuit 16, the moire pattern eliminating means has no influence on the size of the images. As for the periodicity of the Dither processing, the low frequency components of the read data are eliminated by the optical enlargement and the phase of the read data changes to some extent by the electrical reduction, whereby there will be no moire pattern in simple reading. If the moire pattern is eliminated in the printed image on the paper 32, the image processing in that area is terminated. If there is still a moire pattern, the moire pattern eliminating signal generating portion 24 is activated again to effect the image processing again with a different eliminating magnification rate Nd set in the moire pattern eliminating data generating portion 25.

In general, a moire pattern will not be generated when the reading pitch is eight times as close as the dot pitch of the original 11. Therefore, the generation of the moire pattern can be prevented so long as the original has a dot density more sparse than ⅛ of the reading density at the maximum possible magnification rate.

The image editing operation by the attribute RAM 21, the Dither ROM 22 and the like shown in FIG. 2 will be described in the following.

Attribute data for editing a plurality of image areas the original 11 is written in the attribute RAM 21. Each of the image areas can be designated by a group of one or more 1 mm × 1 mm units.

The attribute data is represented by 4 bits (d3, d2, d1, d0), each representing the attribute information shown in Table 1.

TABLE 1

| | (attribute information) |
|---|---|
| d3: | white/valid pixel |
| d2: | reversal/non-reversal |
| d1: | binary/Dither |
| d0: | Dither pattern 1/Dither pattern 2 |

Namely, bit d0 designates two Dither patterns, d1 designates either binary processing or Dither processing, bit d2 designates reversal of black and white, bit d3 designates blankness.

By using the four bit attribute data shown in Table 1, eight attributes may be provided as shown in Table 2.

TABLE 2

| | (attribute data) |
|---|---|
| 00xx | white |
| 01xx | black |
| 100x | binary |
| 1010 | Dither 1 |
| 1011 | Dither 2 |
| 110x | reversal, binary |
| 1110 | reversal, Dither 1 |
| 1111 | reversal, Dither 2 |

Editing operations, such as masking, trimming, white/black reversal, and binary/half tone selection can be effected in accordance with the attribute data set in the attribute RAM 21.

The Dither ROM 22 is selected based on the attribute data and generates a threshold value of the Dither pattern 1 or the Dither pattern 2 in response to the value of the attribute information d0, with the threshold value being generated as an (m×n) matrix.

The selector 23 selects either the threshold value from the Dither ROM 22 or a binary threshold value in response to the attribute information d1 and the same to the compare circuit 17. More specifically, if the attribute is Dither, it selects the data from the Dither ROM 22, and if the attribute is binary, it selects the binary threshold value, data and then transmits the selected data to the compare circuit 17.

The compare circuit 17 compares the image data with the threshold value from the selector 23, and transmits the result to the selective output circuit 18. If the attribute information d3 is "0", it transmits white data. The selective output circuit 18 also receives an inverted signal of the output signal from the compare circuit 17 inverted by the inverter 19. The selective output circuit 18 selects either the reversal or non-reversal data in response to the attribute information d2 and outputs the selected data to the printer 31 in synchronization with the valid image signal.

These operations are carried out in correspondence with one reading operation of the original 11 by the above mentioned image reader. Namely, the pixel data in an area of the original 11 corresponding to an area designated by the attribute RAM 21 is processed based on the attribute information for that area.

An actual example of the processing of the original 11 shown in FIG. 6 by the above described image processing apparatus 1, and the printing of the same on the paper 32 by the printer 31, will be described in the following.

Figure 6:
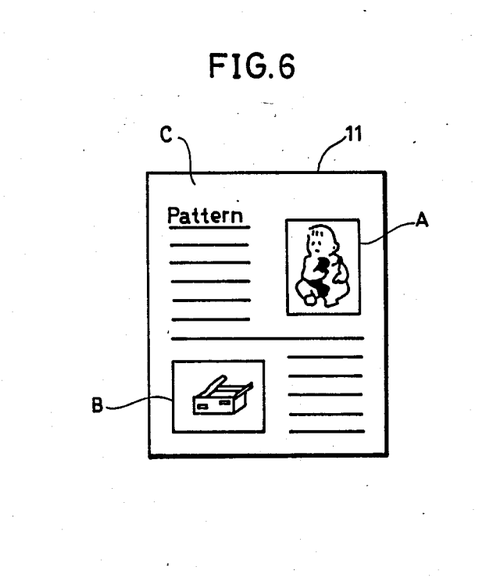
FIG. 6 shows one example of an original to be read in one embodiment of the present invention.

The original 11 shown in FIG. 6 comprises three types of images, that is, half tone images A and B having different densities (dot pitches) and a character image (binary image) C.

Figure 7A:
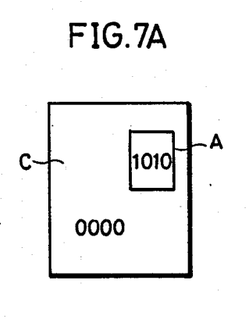
FIGS. 7A to FIG. 7C show data to be written in an attribute RAM in correspondence with the original of FIG. 6.

First, in order to process area A, an attribute data of "1010" is set for image area A, and an attribute data of "0000" is set for the other image areas B and C, as shown in FIG. 7A.

In the moire pattern eliminating data generating portion 25, "2" is set as the eliminating magnification rate Nd and the moire pattern eliminating signal generating portion 24 is operated to generate the moire pattern eliminating signal. Thereafter, the original 11 is entirely read for processing, with the image signals transmitted to the printer 31 to provide a first printing on the paper 32.

Figure 8A:
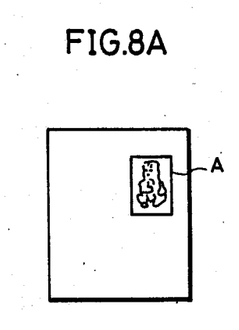
FIGS. 8A to 8C show images of the original of FIG. 6 processed area by area.

By doing so, the images on the original 11 are enlarged by a factor of 2 by the optical mechanism 12 and read by the image pickup device 13 to convert the image to electrical signals. Thereafter, the electrical signals are passed through the A/D converter 14, the shading circuit 15, and finally reduced to one half by the electrical reducing circuit 16. Thereafter, only image area A is half tone processed by the Dither pattern 1 and other image area are made blank in accordance with the attribute information from the RAM 21. Finally, the image shown in FIG. 8A is printed on the paper 32.

Figure 7B:
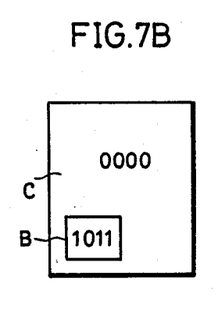

When the printing on the paper 32 is finished, an attribute data of "1011" is set for the image area B as shown in FIG. 7B in order to process the image B. An attribute data of "0000" is set for the other image areas A and C.

In the moire pattern eliminating data generating portion 25, 1.6 is selected as the eliminating magnification rate Nd and the moire pattern eliminating signal generating portion 24 is operated to generate the moire pattern eliminating signal. Thereafter, the original 11 is entirely read for processing, with the image signals transmitted to the printer 31 to effect a second printing on the paper 32.

Figure 8B:
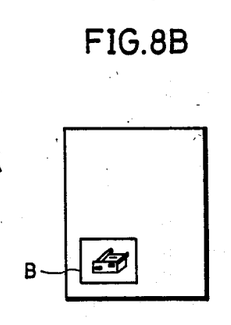

By doing so, only the portion of the image area B is half tone processed by the Dither pattern 2, and the other image area A and C are made blank so that the image shown in FIG. 8B printed on the same paper 32.

If there are moire patterns generated in the image B printed on the paper 32, the eliminating magnification rate Nd set in the moire pattern eliminating data generating portion 25 is changed and the process will be repeated.

Figure 7C:
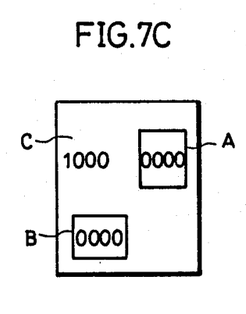

Next, an attribute data of "1000" is set for image area C as shown in FIG. 7C. An attribute data of "0000" is the other image areas A and B. The original 11 is entirely read for processing and the image signals are transmitted to the printer 31 to effect a third printing on the same paper 32.

Figure 8C:
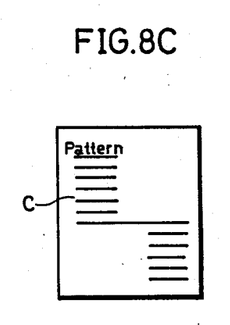

Thus, only image area C is binary processed and portions other than image area C are made blank so that the image shown in FIG. 8C may be printed on the same paper 32.

By using the above three steps of image processing, the image areas A, B and C are sequentially composed on the paper 32 to provide the same image as the original 11. Since a proper moire pattern eliminating process is carried out on the image areas A and B by changing the enlarging magnification rate N of the optical mechanism 12 in accordance with respective dot pitches for reading, the generation of the moire patterns respect to image areas A and B can be prevented. Since the moire pattern eliminating process is not carried out for image area C, the degradation of images can be prevented.

Although the processing of the image areas of an original 11 comprising three types of images, namely, half tone image areas A and B having different dot pitches and a character image (binary image) C has been described in the foregoing, the present invention may be similarly applied to an original having two half tone image areas, one half tone image and one character image area, more than four image areas, and other various image areas combinations. Proper moire pattern elimination can be carried out on respective half tone images having different dot pitches. The order of processing image areas is not limited to that in the above described embodiment but can be freely set.

The above described embodiment may be further adapted to automatically generate a moire pattern eliminating signal when processing an image area with where the attribute data bits designating half tone processing are set in the attribute RAM 21. A plurality of eliminating magnification rate setting portions may be provided in the moire pattern eliminating data generation portion 25 so as to enable setting of a plurality of eliminating magnification rates. The setting of the eliminating magnification rate is not necessarily stepwise and may also be carried out continuously.

The paper 32 is manually inserted in the printer 31 to compose images on the paper 32 as provided in the above described embodiment. For this purpose, it is preferred that the printer 31 has the capability of composing images so that images may be composed not only on the paper 32 also but on an image memory in the printer 31. That an image memory for composing images may be easily provided in the image processing apparatus 1.

Figure 9:
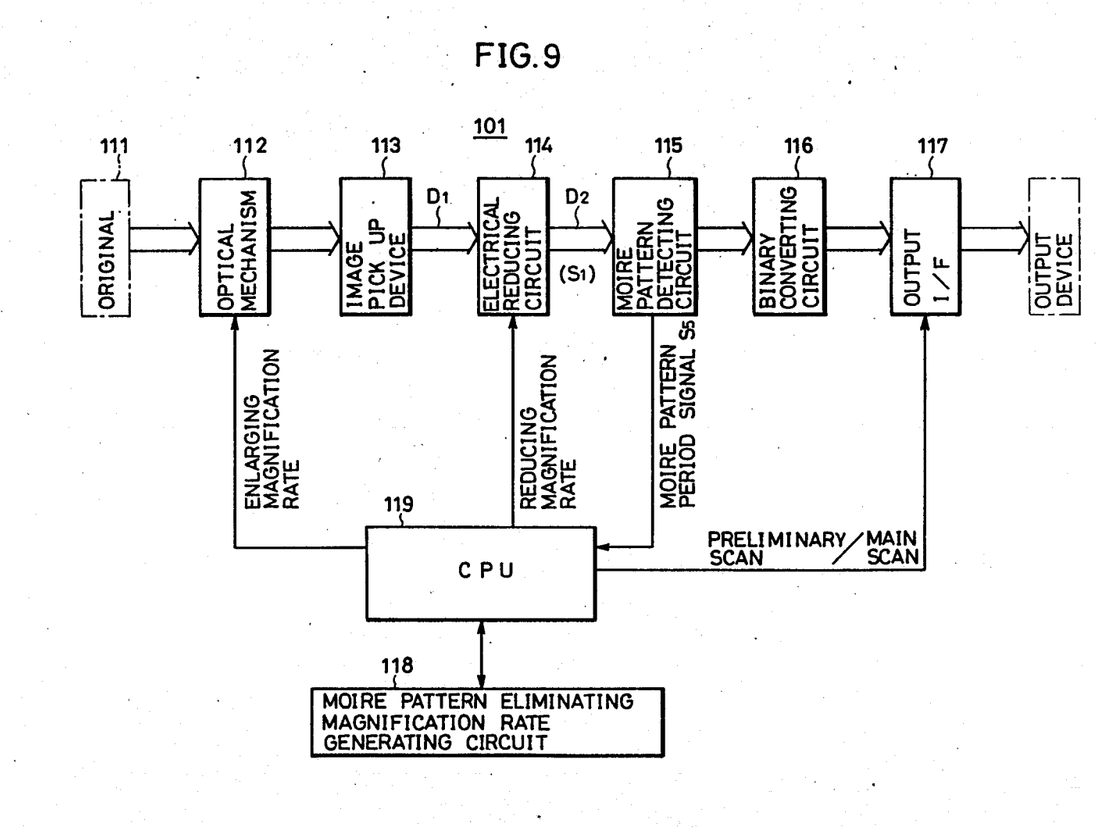
FIG. 9 is a block diagram showing an electric circuit of an image processing apparatus in accordance with another embodiment of the present invention.

FIG. 9 is a block diagram showing an electrical circuit of an image processing apparatus in accordance with another embodiment of the present invention.

The image processing apparatus 101 comprises an optical mechanism 112 capable of enlarging and reducing images of an original 111; an image pickup device (CCD) 113 which reads the image of the original 111 through the optical mechanism 112 to convert the image into image data signals corresponding to the density thereof; an electrical reducing circuit 114 which reduces the image by thinning out the image data provided by the image pickup device 113; a moire pattern detecting the circuit 115 for detecting period of the moire pattern from the image data; a binary converting circuit 116 which binary-processes or half tone-processes the density of the image to convert the same to binary signals; an output interface 117 for outputting the binary signals from the binary converting circuit 116 to an output device such as a printer; a moire pattern eliminating magnification rate generating circuit 118 for generating the magnification rate for eliminating moire patterns; and a CPU 119 for controlling all these components.

The operation of the circuit will be described in the following with reference to the figures.

The reading of the original 111 by the image pickup device 113 begins with a preliminary scanning wherein a suitable magnification rate is determined by detecting the period of the moire pattern. Thereafter a main scanning for reading the original 111 using the magnification rate determined by the preliminary scanning is accomplished and to an external output device such as a printer.

In the preliminary scanning, the CPU 119 sends a preliminary scanning signal to the output interface portion 117 to prohibit external output from the output interface portion 117. When a moire pattern period signal is detected among the signals inputted to the CPU 119 from the moire pattern detecting circuit 115 during the preliminary scanning, the CPU 119 determines that a moire pattern is being generated. The CPU 119 then transmits a signal to the moire pattern eliminating magnification rate generating circuit 118 so as to receive therefrom the magnification rate in correspondence with the period of the moire pattern. By way of example, the moire patten eliminating magnification rate generating circuit 118 may consist of a RAM or ROM in which magnification rates highly effective for eliminating moire patterns in association with several different dot have been stored as a table. The CPU 119 searches the table for either the detected period of the moire pattern or the dot pitch and takes the most effective magnification rate from the table of the moire pattern eliminating magnification rate generating circuit 118.

Since the structure and the operation of the electrical reducing circuit are the same as the above described embodiment, the description thereof will be omitted.

Figure 10:
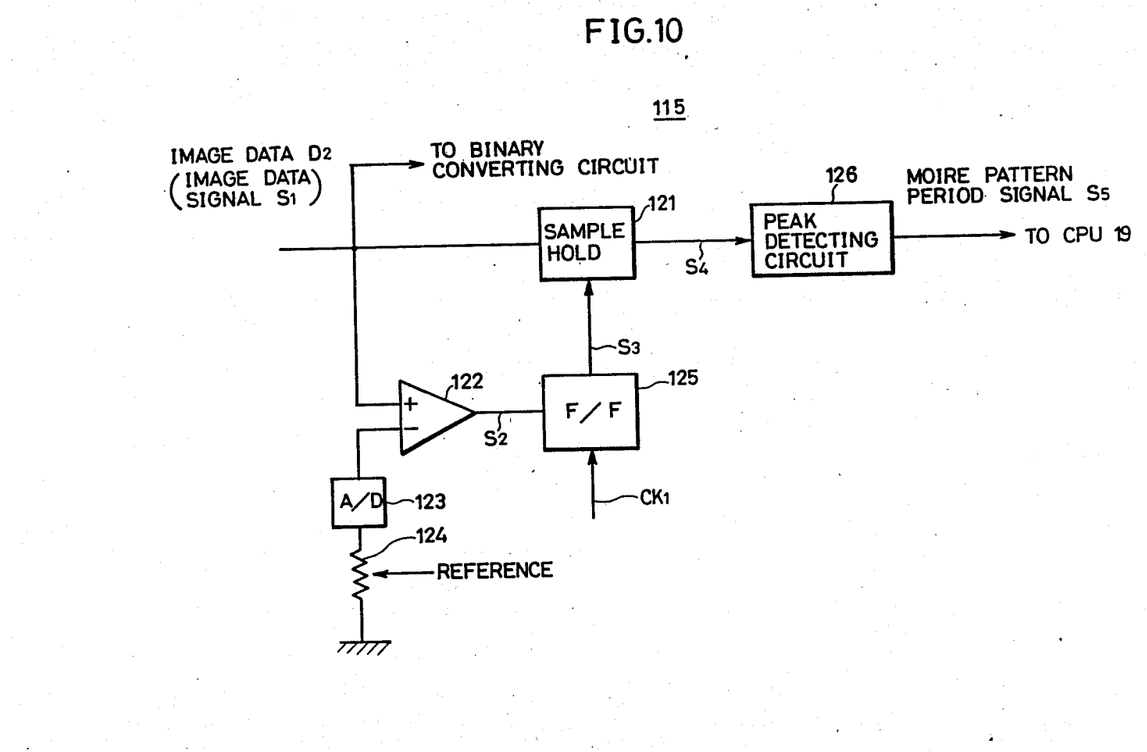
FIG. 10 is a block diagram showing the circuit structure of the moire pattern detecting circuit of FIG. 9.
Figure 11:
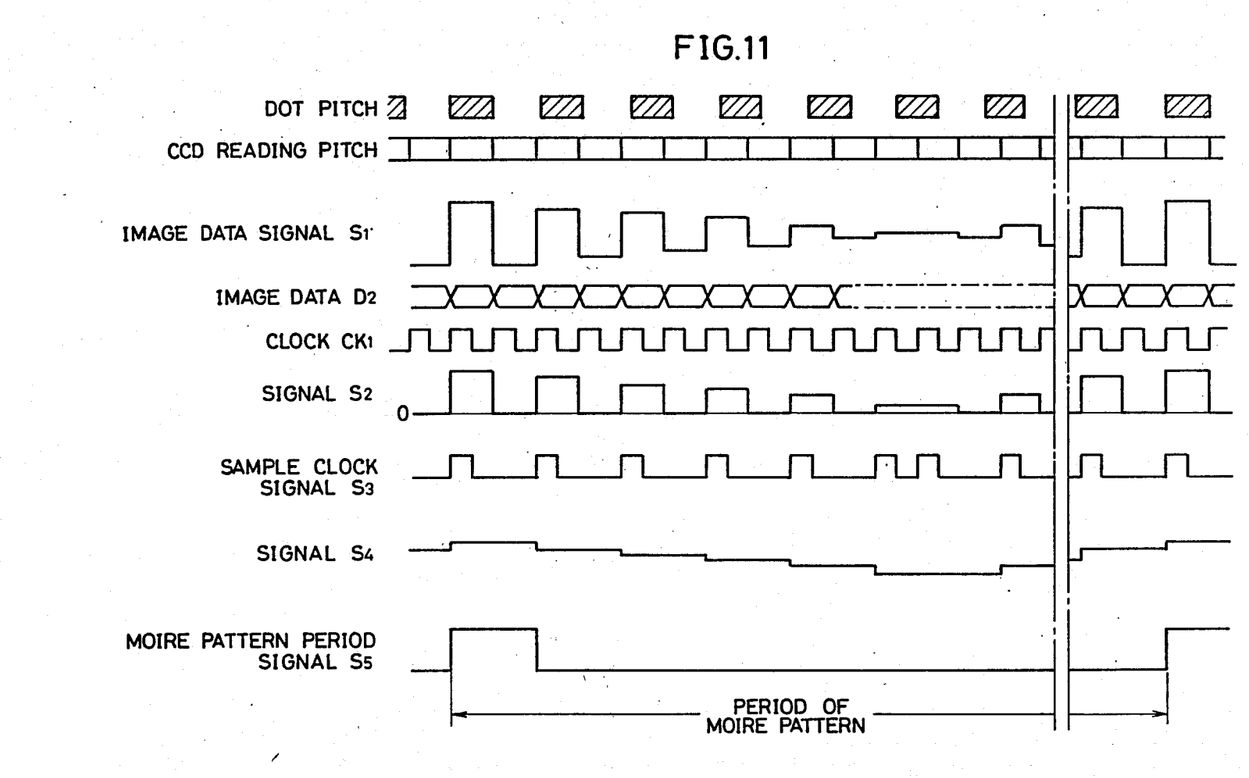
FIG. 11 is a time chart showing states of signals in main portions of the detecting circuit of FIG. 10.

FIG. 10 is a block diagram of the moire pattern detecting circuit 115 of FIG. 9, and FIG. 11 is a time chart showing the state of the main portions of signals in the moire pattern detecting circuit 115. The structure and operation will be described in the following with reference to both figures.

As shown in FIG. 11, where the reading pitch of the image pickup device (CCD) 113 is not identical with the dot pitch of the original image, the image data signal S1 transmitted from the electrical reducing circuit 114 has a waveform where the pulse amplitude periodically changes with the half value being the center.

The image data signal S1 is inputted to a sample and hold circuit 121 and to a comparator 122. The comparator 122 compares the image data signal S1 with a reference voltage set by a reference voltage generating circuit comprising a setting device 124 and an AD converter 123. The comparator 122 eliminates the offset component of the image data signal S1 outputs and a signal S2 representing the component of the image data signal S2 that is higher than the reference voltage. A flip-flop 125 outputs a sample clock signal S3 created from the signal S2 and the clock CK1 for transferring images. The sample and hold circuit 121 samples and thereafter holds the image data signal S1 in sync with the clock signal S3 and outputs a signal S4. A peak detecting circuit 126 detects the peak of the signal S4 and outputs a moire pattern period signal S5, equal to the period of the moire pattern, to the CPU 11$^n$.

The operation of the moire pattern eliminating means partially comprised by the optical mechanism 112 and the electrical reducing circuit 114 will be described in the following.

Following a preliminary scanning, the CPU 119 receives the eliminating magnification rate Nd from the moire pattern eliminating magnification rate generating circuit 118 and multiplies the eliminating magnification rate Nd with the printing magnification rate Na to calculate the enlarging magnification rate N of the optical mechanism 112. If the calculated value exceeds the maximum limit of the optical mechanism 112, the maximum possible magnification rate becomes the enlarging magnification rate N. Thereafter, the reducing magnification rate Na/N of the electrical reducing circuit 114 is calculated. The magnification rates N and Na/N obtained in this manner are outputted to the optical mechanism 112 and to the electrical reducing circuit 114 as a lens magnification rate signal and the reducing magnification rate signal, respectively.

Assuming that the printing magnification rate Na is 1.1 and the eliminating magnification rate Nd determined by the preliminary scanning is 1.8, then the enlarging magnification rate N of the optical mechanism 112 will be 1.98 ($=1.1\times 1.8$) and the magnification rate of the electrical reducing circuit 114 will be 1/1.8 ($=1.1\times 1/1.98$).

Then the main scanning is started and the images on the original 111 are optically enlarged N times by the optical mechanism 112 read by the image pickup device 113, and thereafter, reduced to Na/N by the electrical reducing circuit 114. The CPU 119 then sends a main scanning signal to the output interface portion 117 to permit external output.

According to the former embodiment of the present invention, even if there are a plurality of image areas each having thick portions and thin portions of different dot pitches, the generation of moire patterns in the respective images areas can be prevented.

According to the latter embodiment of the present invention, the moire pattern incidental to an reading of the original can be effectively eliminated, the magnification rate allowing for the most effective elimination of the moire pattern in association with the dot pitch of the original can be easily selected, and the labor and time for elimination can be reduced.

It goes without saying that more effective elimination of the moire patterns can be effected by combining both of the above described embodiments.

More specifically, when an original having a plurality of images each having portions of different densities is processed, the periods of the moire patterns may be detected for the respective image areas. The most effective projection magnification rates based on the period of the moire pattern for each image area may be selected, and the moire pattern elimination may be repeated for respective image areas, whereby the entire image with the moire patterns eliminated can be provided to an output device.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus capable of eliminating a moire pattern, comprising:
   an image sensor for converting an image of a original into electrical data;
   optical projecting means for projecting an image of the original onto said image sensor and capable of changing a magnification rate of projection;
   data reducing means for electrically reducing the electrical data converted by said image sensor;
   area designating means for designating an area of a half tone image on the original;
   magnification rate setting means for setting a magnification rate for eliminating a moire pattern generated when the image of the area designated by said area designating means is converted by said image sensor; and
   control means for controlling said optical projecting means such that said optical projecting means projects the image of the original at a projection magnification rate based on the magnification rate set by said magnification rate setting means and for controlling said data reducing means such that said data reducing means reduces the electrical data at a reducing magnification rate in correspondence with the projection magnification rate of said optical projecting means.

2. An image processing apparatus according to claim 1, wherein said area designating means comprises
   invalid data setting means for setting a data which invalidates the electrical data converted by said image sensor for that area of the original other than the designated area.

3. An image processing apparatus according to claim 2, further comprising
   data output means for outputting the electrical data reduced by said data reducing means as image data, wherein
   said data output means outputs, when there are a plurality of different areas of half tone images, valid image data of respective areas by designating the respective areas with said area designating means.

4. An image processing apparatus according to claim 2, wherein said area designating means comprises:
   a memory region for storing data regarding the designated area, where such data consists of data representing that the designated area is a half tone image, and data representing that the image data corresponding to areas other than the designated area is invalid.

5. An image processing apparatus according to claim 1, wherein said magnification rate data setting means comprises
   key input means for setting a magnification rate.

6. A method for eliminating a moire pattern generated when an original having a plurality of areas of different half tone images is read by an image sensor to be processed, comprising the steps of:
   designating a half tone image area;
   setting a magnification rate suitable for projecting an optical image of said designated area on an image sensor;
   projecting the image of said designated area at said magnification rate onto said image sensor;
   converting the image projected on said image sensor into electrical data;
   outputting image data by reducing said converted electrical data at a reducing magnification rate corresponding to said magnification rate; and
   repeating the above steps in a similar manner for other half tone image areas.

7. A method for eliminating a moire pattern according to claim 6, wherein said step of setting said magnification rate comprises the steps of:
   detecting a period of the moire pattern generated when said half tone image area is projected on said image sensor; and
   determining said magnification rate based on said detected period of the moire pattern.

8. A method for eliminating a moire pattern according to claim 7, wherein said step of detecting the period of the moire pattern comprises the steps of:
   projecting the image of said designated area by equal scale magnification onto said image sensor;
   converting the image projected by equal scale magnification onto said image sensor into an electrical data;
   outputting a signal having the same period as the moire pattern based on said converted electrical data.

9. A method for eliminating a moire pattern according to claim 6, wherein
   said step of outputting image data comprises the steps of forming an image on a prescribed paper based on the outputted image data of said half tone image area, and
   forming an image on said prescribed paper based on the image data of said other half tone image areas.

10. An image processing apparatus capable of eliminating a moire pattern, comprising:
    an image sensor for converting an image of an original into electrical data;
    optical projecting means for projecting the image of the original onto said image sensor and capable of changing the magnification rate of projection;
    data reducing means for electrically reducing the electrical data converted by said image sensor at a reducing magnification rate corresponding to the magnification rate of projection of said optical projecting means;
    moire pattern eliminating means for eliminating a moire pattern, generated when the image of the original is converted into electrical data by said image sensor, by controlling said optical projecting means such that it is operated at a prescribed magnification rate of projection;
    magnification rate determining means for detecting a period of the generated moire pattern based on the electrical data converted by said image sensor and for determining said magnification rate of projection in accordance with the period of said moire pattern; and
    control means adapted to activate said moire pattern eliminating means using the magnification rate of projection determined by said magnification rate determining means.

11. An image processing apparatus according to claim 10, wherein said control means comprises:
    a first activating means for activating said magnification rate determining means without activating said moire pattern eliminating means, and
    a second activating means for activating said moire pattern eliminating means where said first and second activating means are successively operated.

12. An image processing apparatus according to claim 10, wherein said magnification rate determining means comprises:
   a moire pattern period detecting circuit for detecting the period of the moire pattern, and
   a memory region for storing a plurality of periods of the moire patterns and corresponding magnification rates of projection and for outputting said magnification rate of projection in response to an output of said moire pattern period detecting circuit.

13. An image processing apparatus according to claim 11, further comprising:
   data output means for outputting the electrical data reduced by said data reducing means as image data, wherein
   said first activating means does not activate said data output means, and
   said second activating means does activate said data output means.

14. A method for eliminating a moire pattern generated when an original is read by an image sensor to be processed, comprising the steps of:
   projecting the image of the original on an image sensor at a first magnification rate of projection;
   converting the image projected on said image sensor to a first electrical data;
   detecting a period of the generated moire pattern based on a converted first electrical data;
   determining a second magnification rate of projection in correspondence with a detected period of the moire pattern;
   projecting the image of the original on the image sensor using said second magnification rate of projection;
   converting the image projected at said second magnification rate of projection into a second electrical data; and
   outputting image data obtained by reducing said second electrical data at a reducing magnification rate in correspondence with said second magnification rate of projection.

15. A method for eliminating a moire pattern according to claim 14, wherein
   said second magnification rate of projection is the same as said first magnification rate of projection when said period of the moire pattern is not detected.

16. A method for eliminating a moire pattern according to claim 14, wherein:
   said step of projecting the image on said image sensor at a first magnification rate of projection comprises the step of designating a half tone image area of the original, whereby the image of the designated area is projected on said image sensor; and
   said method further comprises repeating a similar step for other half tone image areas.

17. An image processing apparatus capable of eliminating a moire pattern, comprising:
   an image sensor for converting an image of an original into electrical data;
   optical projecting means for projecting the image of the original onto said image sensor and capable of changing a magnification rate of projection;
   data reducing means for electrically reducing the electrical data converted by said image sensor at a reducing magnification rate corresponding to the magnification rate of projection of said optical projecting means;
   area designating means for designating an area of a half tone image on the original;
   moire pattern eliminating means for eliminating a moire pattern, generated when the image of the original is converted into electrical data by said image sensor, by controlling said optical projecting means such that it is operated at a prescribed magnification rate of projection;
   data control means for invalidating the electrical data converted by said image sensor for areas other than the area designated by said area designating means;
   magnification rate determining means for detecting the period of the generated moire pattern based on the electrical data not invalidated by said data control means and for determining said magnification rate of projection from said period of the moire pattern; and
   moire pattern controlling means adapted to activate said moire pattern eliminating means using the magnification rate of projection determined by said magnification rate determining means to eliminate the moire pattern in said designated area.

18. An image processing apparatus according to claim 17, further comprising:
   data output means for outputting the electrical data reduced by said data reducing means as image data, wherein
   said data output means outputs, when there are a plurality of different areas of half tone images, valid image data of respective areas by designating the respective areas with said area designating means.

19. An image apparatus according to claim 17, wherein said area designating means comprises:
   a memory region for storing data regarding the designated area, where such data consists of designated data representing that the designated area is a half tone image, and data representing that the image data corresponding to areas other than the designated area is invalid.

20. An image processing apparatus according to claim 17, wherein said moire pattern control means comprises:
   a first activating means for activating said magnification rate determining means without activating said moire pattern eliminating means, and
   a second activating means for activating said moire pattern eliminating means where said first and second activating means are successively operated.

21. An image processing apparatus according to claim 17, wherein said magnification rate determining means comprises:
   a moire pattern period detecting circuit for detecting the period of the moire pattern, and
   a memory region for storing a plurality of periods of the moire patterns and corresponding magnification rates of projection and for outputting said magnification rate of projection in response to an output of said moire pattern period detecting circuit.

22. An image processing apparatus according to claim 20, further comprising:
   data output means for outputting the electrical data reduced by said data reducing means as image data, wherein said first activating means does not activate said data output means, and said second activating means does activate said data output means.

23. In a copying machine for reproducing copies of originals having indicia of individual size and period that can create moire patterns with the optical pickup apparatus for converting optical images into electrical signals, the improvement comprising:

means for optically varying the image of the indicia on the original;

means for setting and storing a plurality of image to document size ratios that will resolve a moire pattern problem for particular indicia of a particular size and period, and means for accessing a specific image to document size ratio to control the optically varying means for resolving the moire pattern.

24. An image processing apparatus capable of eliminating a moire pattern, comprising:

an image sensor for converting an image of an original into electrical data;

variable optical projection means for projecting the image of the original onto the image sensor at various image to document size ratios;

moire pattern detecting means for detecting a period of a moire pattern based on the electrical data converted by the image sensor;

control means for varying the image to document size ratio of the variable optical projection means in accordance with the period of the moire pattern detected by the moire pattern detecting means, and data reducing means for electrically varying the image to document size ratio of the electrical data converted by the image sensor.

* * * * *